United States Patent [19]
Sibley et al.

[11] Patent Number: 5,377,481
[45] Date of Patent: Jan. 3, 1995

[54] APPARATUS FOR BALING BULK FIBROUS MATERIAL

[76] Inventors: Duane L. Sibley, H.C.R. 67 Box 169; Dwight A. Sibley, H.C.R. 67 Box 161, both of Nashua, Mont. 59248

[21] Appl. No.: 32,645

[22] Filed: Mar. 17, 1993

[51] Int. Cl.⁶ .................... A01D 39/00; A01F 15/02; A01F 17/00
[52] U.S. Cl. ........................... 56/341; 56/432; 100/19 R; 100/145
[58] Field of Search ................ 56/341, 432; 100/18, 100/19 R, 83, 76, 139, 145, 148, 191

[56] References Cited

U.S. PATENT DOCUMENTS

| | | | |
|---|---|---|---|
| 2,080,316 | 5/1937 | Innes | 100/145 X |
| 2,179,937 | 11/1939 | Lamp | 100/145 X |
| 2,696,777 | 12/1954 | Sutch | 100/148 X |
| 3,044,391 | 7/1962 | Pellett | 100/148 |
| 3,063,361 | 11/1962 | Gehrke | 100/145 X |
| 3,218,993 | 11/1965 | Forth | 107/14 |
| 4,119,025 | 10/1978 | Brown | 100/35 |
| 4,186,658 | 2/1980 | Brown | 100/148 |
| 4,256,035 | 3/1981 | Nevfeldt | 100/145 |
| 5,009,062 | 4/1991 | Urich et al. | 56/341 |
| 5,020,311 | 6/1991 | Matthies | 56/432 |

FOREIGN PATENT DOCUMENTS 2521392 8/1983 France .................. 56/341

*Primary Examiner*—David J. Bagnell
*Attorney, Agent, or Firm*—Harry M. Cross, Jr.

[57] ABSTRACT

The apparatus of this invention forms and binds fibrous bulk material or the like into bales and comprises bale forming apparatus for forming the material into an elongated continuous mass. The bale forming apparatus has a bale-forming compartment with an infeed end and a discharge end, and material flow restricting apparatus located between the infeed and discharge ends for resisting the movement of the material. Auger feeding apparatus for conveying the material into the infeed end of said bale-forming compartment, and bale binding apparatus for receiving the mass of material from the discharge end of said bale-forming compartment and binding said mass into discrete bales, are provided. The improvement of this invention comprises the provision of compacting roller apparatus so constructed and arranged with respect to the auger feeding apparatus whereby material is conveyed through said compacting roller apparatus into said bale-forming compartment and compacted against the mass of material at the bale-forming compartment infeed end. The compacting roller apparatus and the material flow restricting apparatus cooperatively function to create the mass of material in a compacted condition with material being added to the mass of material at the bale-forming compartment infeed end and compressed thereto by the compacting roller apparatus.

29 Claims, 10 Drawing Sheets

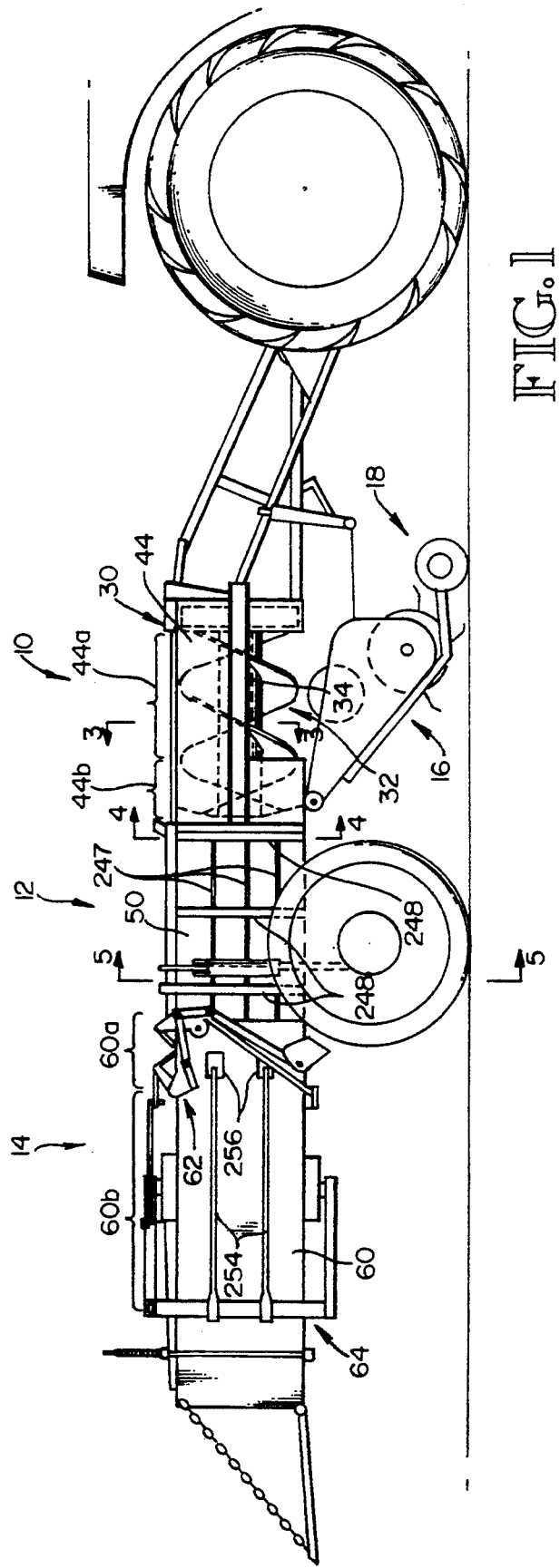
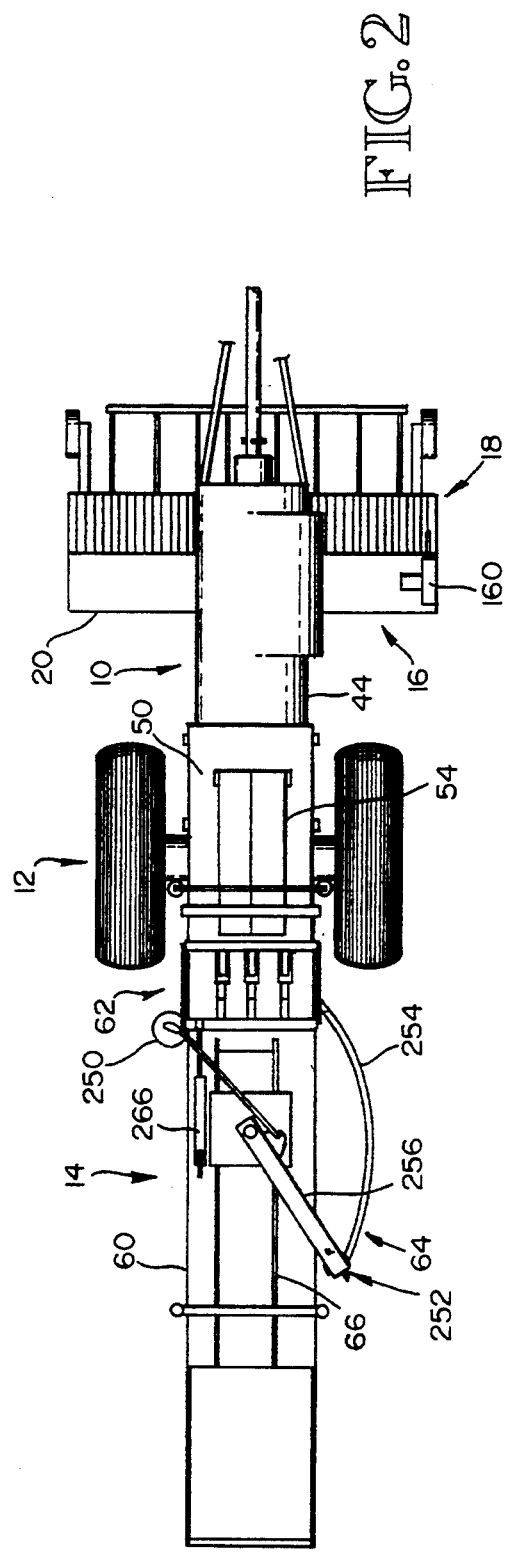

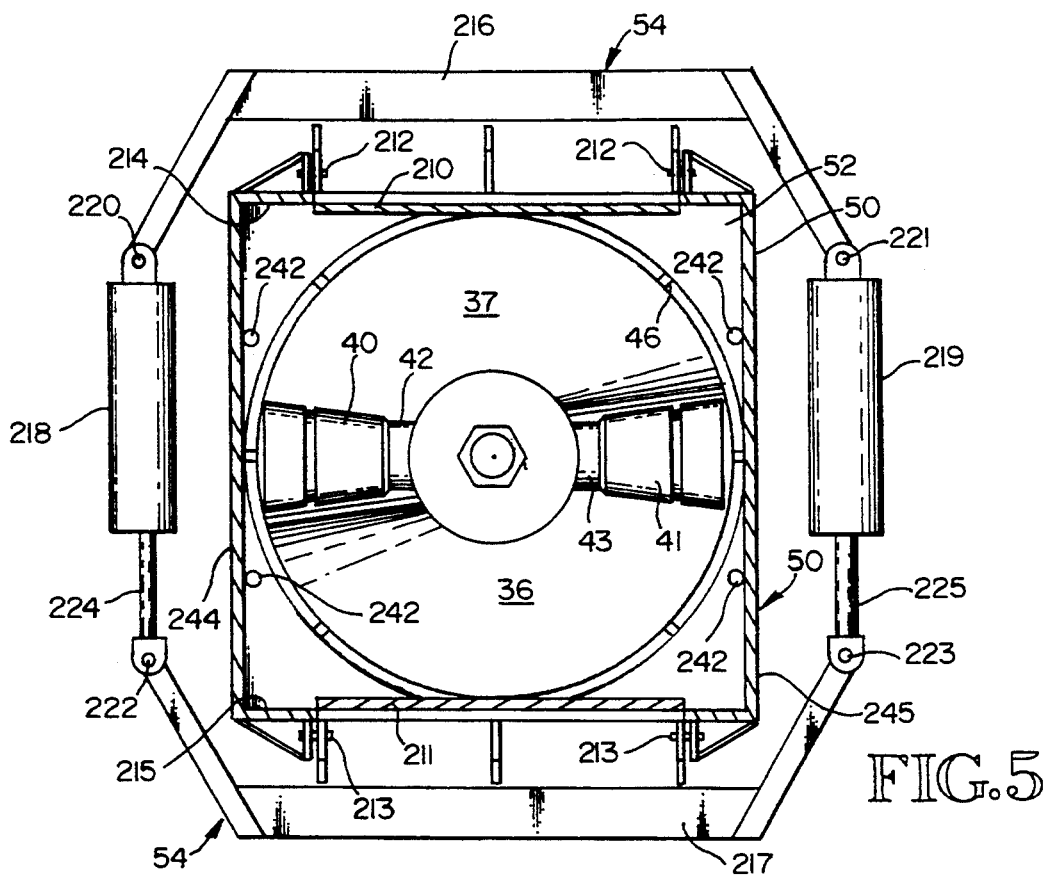

APPARATUS FOR BALING BULK FIBROUS MATERIAL

FIELD OF THE INVENTION

This invention relates to apparatus for forming bulk fibrous material or the like into bales. More particularly, this invention relates to apparatus that can be towed or driven through a field for picking up and baling bulk material into bound bales.

BACKGROUND OF THE INVENTION

Fibrous material balers, such as hay and straw balers, are known for compressing fibrous material and binding the material into bales bound by twine or wire. This type of machine is commonly used on farms and ranches for baling hay, straw, and other fibrous materials. This type of machine has also been used in various industrial and commercial applications. The trend in baling machine development has been to design machines capable of producing larger and larger bales to minimize handling; it being more efficient to handle fewer larger bales as compared to handling more numerous smaller bales. Such machines have been proposed based on conventional plunger-type systems wherein fibrous material is packed by means of a plunger to produce rectangular or square bales. Such machines has also been proposed based on conventional round bale systems wherein fibrous material is rolled upon itself. In these systems, the packing and compressing of the material must be interrupted in order to bind or tie each bale. Because of the shape of round bales, they have more spoilage than square bales; trapping rain and snow when they are stacked. Also, the shape of round bales prevents compact storage. Moreover, use of such machines in agricultural settings produces bales of tightly wrapped material that cannot be easily separated or loosened when the bale is opened.

Baling machines for fibrous bulk material have been proposed that employ an auger feeding mechanism to compact the material into a denser unit for binding; one of the latest being that disclosed in U.S. Pat. No. 5,009,062 issued to Oren D. Urich. Such as have been proposed have attempted to produce more compact, denser, bales than conventional plunger-type systems or round bale-type systems. Most such, however, appear to be rather complicated and employ complicated, unconventional binding mechanisms. Oftentimes, these systems employ reciprocating mechanisms to effect relative longitudinal movement between the auger feed mechanism and the binding compartment during the interval that the binding operation takes place in order for the auger feed mechanism to operate continuously. None appear to have been able to successfully supplant conventional plunger-type and round bale-type machines.

In the hay industry in particular, railcar loads of baled hay are being transported from the hay-growing regions of the country to other parts of the country. Present day hay baling machines of the conventional plunger-type do not produce bales that are both small enough to be loaded easily loaded onto and off-loaded from railcars and dense enough to fill a railcar to its weight limit. In the typical case, a railcar is filled to its volume capacity long before its weight capacity is reached. This case results in greater transport charges per ton than need be.

The smaller farming operations do not have any present day alternatives and, therefore, do not have ready access to long distance interstate railcar shipment of baled hay; the higher per ton shipping costs mitigating against profitable shipment by railcar. For the smaller farming operations to compete successfully in this long distance railcar market, they must have hay baling equipment that is affordable and that will produce relatively small and dense bales that can be handled on the farm without employing costly auxiliary equipment. And the bales must be dense enough that a railcar's load capacity can be reached before its volumetric capacity. For many such farming operations, the physical size of a bale that is dense enough should be on the order of 2 ft.×2 ft.×4 ft. up to 4 ft.×4 ft.×8 ft; with the latter size bordering on being too large for convenient handling. Many conventional plunger-type balers produce bales 14 in.×18 in.×4 ft.

SUMMARY OF THE INVENTION

The apparatus of this invention forms and binds fibrous bulk material or the like into bales and comprises bale forming means for forming the material into an elongated continuous mass. The bale forming means has a bale-forming compartment with an infeed end and a discharge end, and material flow restricting means located between the infeed and discharge ends for resisting the movement of the material. Auger feeding means for conveying the material into the infeed end of said bale-forming compartment, and bale binding means for receiving the mass of material from the discharge end of said bale-forming compartment and binding said mass into discrete bales, are provided. The improvement of this invention comprises the provision of compacting roller means so constructed and arranged with respect to the auger feeding means whereby material is conveyed through said compacting roller means into said bale-forming compartment and compacted against the mass of material at the bale-forming compartment infeed end. The compacting roller means and the material flow restricting means cooperatively function to create the mass of material in a compacted condition with material being added to the mass of material at the bale-forming compartment infeed end and compressed thereinto by the compacting roller means.

The auger feeding means comprises a longitudinal auger shaft having an infeed end and a discharge end, at least one conveyor flight mounted by the shaft between the shaft infeed and discharge ends. The compacting roller means is mounted by the auger shaft at the shaft discharge end and is so constructed and arranged with respect to the conveyor flight whereby material conveyed by the auger feeding means will pass from the conveyor flight and through the compacting roller means into the bale-forming compartment for distribution and compaction against the mass of material at the bale-forming compartment infeed end.

A preferred embodiment of the invention includes both a bale-forming compartment and a bale-binding compartment arranged in tandem whereby bulk material may be bound into a discrete bale while bulk material is being simultaneously formed into an elongated mass of material. Both compartments include means for resisting rearward transport of the bulk material so as to enable the bulk material to be compressed into a form suitable for baling.

BRIEF DESCRIPTION OF THE DRAWINGS

FIG. 1 is a simplified side elevation view of the baler of this invention as adapted to field baling of materials such as hay or straw;

FIG. 2 is a simplified top plan view of the FIG. 1 baler;

FIG. 5 is an elevation view in cross section taken along the line 5—5 of FIG. 1;

FIG. 6 is a partial side view of the FIGS. 1-2 baler in perspective illustrating the hay-dividing mechanism of this invention in an inactivated position;

DETAILED DESCRIPTION OF THE INVENTION

Figure 3:
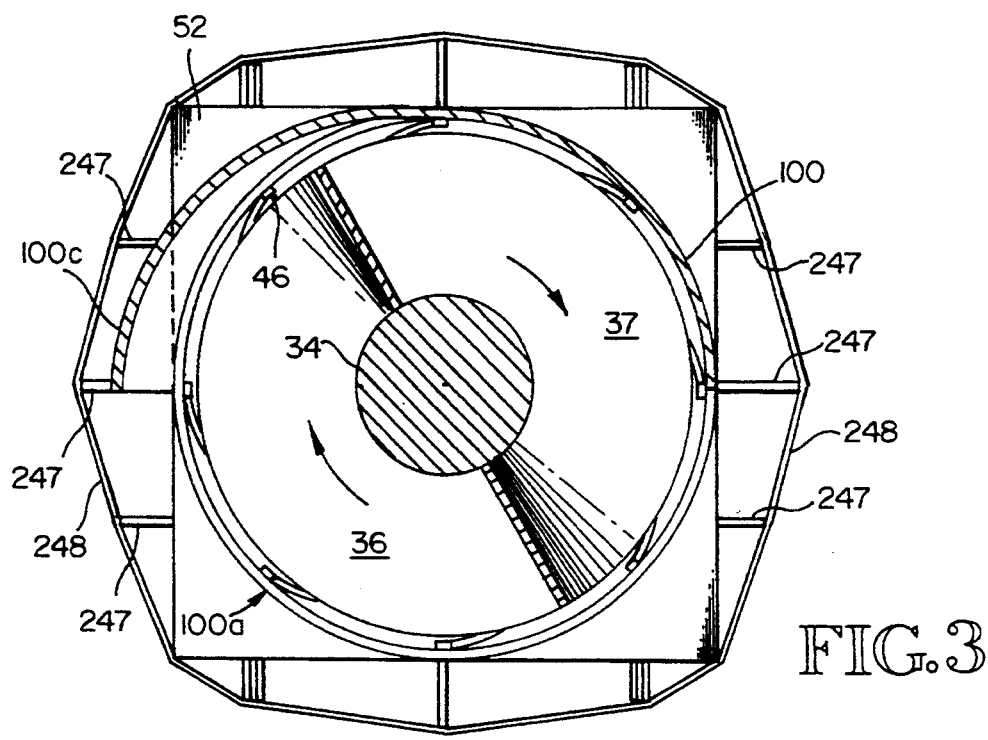
FIG. 3 is an elevation view in cross section taken along the line 3—3 of FIG. 1.
Figure 4:
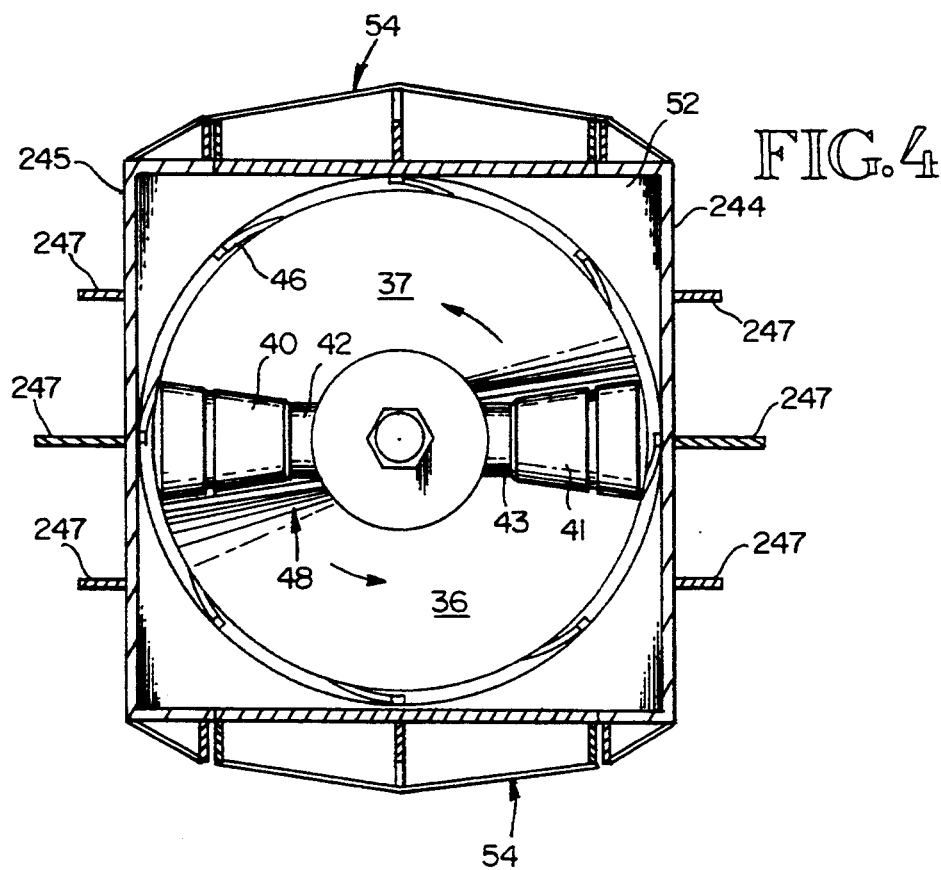
FIG. 4 is an elevation view in cross section taken along the line 4—4 of FIG. 1.

The baling machine of this invention is specifically designed as a field baler to pick up windrowed crop material for baling. The baling machine of this invention is particularly suited for field baling hay and straw and similar kinds of bulk fibrous agricultural materials. The principles of this invention may be employed in stationary machines used for agricultural product baling or for baling of non-agricultural products.

In brief, the baling machine of this invention comprises at least a bulk material auger feeding means 10, and a bale-forming means 12 into which bulk material is transferred by the auger feeding means 10. The baling machine of this invention also preferably comprises a bale binding means 14 and a bulk material charging means 16. In the case of a stationary baling machine, according to this invention, the bulk material charging means 16 may be as simple as a hopper means within which bulk material may be placed into contact with the auger feeding means 10. In the case of a field baling machine for hay or the like, however, the bulk material charging means 16 may preferably include a pick up means 18 for picking up windrowed material from the field and conveying it into a header means 20 for transfer to the auger feeding means 10.

The auger feeding means 10 comprises a rotary drive means 30 so mounted as to rotatably drive an auger 32 about the longitudinal axis of an auger shaft 34 so as to rotate a pair of spiral auger flights 36,37. At the inner end of shaft 34, opposite the drive means 30, compacting roller means 38 is provided, preferably in the form of a pair of compacting rollers 40, 41 mounted on diametrically-opposed radial shafts 42, 43. Roller shafts 42, 43 are mounted by shaft 34 and extend radially outward therefrom. The auger flights 36, 37 are so arranged with respect to the rollers 42, 43 that each roller is positioned adjacent the termination of an auger flight and such that the roller surfaces extend inward beyond the termination of the auger flights so that material conveyed inward by auger flights will flow inward from the auger. Consequently, the material flowing off the inner ends of the auger flights will be contacted for compaction at a compacting surface located inward of the termination of the auger flights. The compacting rollers 40, 41 are preferably conical sections so as to provide a convex compacting surface providing a progressively greater degree of compaction proceeding outward from the longitudinal axis of auger rotation.

The auger 32 is mounted by the rotary drive means 30 and extends, in cantilever fashion, through an auger housing 44. Auger housing 44 is subdivided into a bulk material infeed section 44a and a bulk material conveying section 44b. The infeed section 44a is designed to enable bulk material to be fed into an infeed compartment for engagement by the auger 32 for conveyance inward. The conveying section 44b is designed to provide a cylindrical compartment, within which the auger flights closely fit, through which the bulk material is conveyed from the infeed compartment and inward, past the compacting roller means 38, into the bale-forming means 12. To facilitate conveyance of the bulk material therethrough, the surface of the cylindrical compartment in section 44b is provided with one or more spiral ribs 46 which are of opposite hand from the auger flights. (For example, if the auger 32 rotates clockwise as viewed from the front (infeed) end of the machine, the auger flights 36, 37 would be left hand and the spiral ribs 46, would be right hand).

The bale-forming means 12 provides a longitudinal bale-forming compartment 50 that immediately adjoins the conveying section 44b. Compartment 50 has a cross section that matches the desired cross section of the compacted bale that is the product of the machine; preferably a square cross section for a hay baling machine. There is no transition section between the inner end of conveying section 44b and the adjacent beginning of compartment 50. A transverse wall 52 joins the inner periphery of compartment 50 to the outer periphery of section 44b, preferably perpendicular to the longitudinal axis of auger 32. The length of auger 32 is such that its inner end, as well as the inner edges of compacting rollers 40, 41 extend slightly into the bale-forming compartment 50, on the order of about 1 inch; just enough that the convex compacting surface defined by the rollers 40, 41 is within the compartment 50. Compartment 50 is preferably at least 2 to 3 feet long, but its required length may vary somewhat depending on the cross section dimensions of the bale to be produced by the machine.

The bale-forming means 12, in addition to compartment 50, comprises means 54 for applying transverse compressive force to the bale being formed in compartment 50 so as to offer a resistance against unrestricted movement of the bale being formed through compartment 50. Thus, as material is being conveyed into compartment 50 and formed into a bale therein, means 54 will offer resistance to rearward movement of the bale being formed so that additional material, as it is being conveyed into the forward end of the compartment 50, will be compacted by rollers 40, 41 against the forward end of the bale being formed. The extent of the compaction is dependent upon the amount of resistance to movement that is provided by means 54.

Bale binding means 14 provides a longitudinal binding compartment 60 that is immediately adjacent to, and in-line with, bale forming compartment 50. Binding compartment 60 has an infeed section 60a, which accepts a formed and compacted bale from bale-forming compartment 50, and a bale-binding section 60b. As bulk material continues to be fed by auger feeding means 10 into bale forming means 12, the compacted material extends in a continuous form through compartment 50 and into compartment 60 until the longitudinal extent of the compacted material within compartment 60 is the desired finished bale length. When the appropriate length of compacted material is extended into the binding section 60b of compartment 60, material dividing means 62 separates the compacted material within section 60b from the material extending from compartment 50 into the infeed section 60a of compartment 60. Then, bale tying means 64 is actuated to tie the compacted material in section 60b into a discrete finished bale.

The bale binding means 14, in addition to compartment 60, material dividing means 62 and bale tying means 64, comprises means 66 for applying transverse compressive force to the compacted bale in compartment 60 so as to offer a resistance against unrestricted movement of the compacted bale through compartment 60. Thus, as compacted material is being conveyed through compartment 60, means 66 will offer resistance to rearward movement of the compacted bale so as to maintain the bale in its compacted state as it is tied into a discrete finished bale The extent of the compaction is dependent upon the amount of resistance to movement that is provided by means 66. The resistance means 54 for the bale forming compartment 50 and the resistance means 66 for the bale binding compartment 60 are independent and separately adjustable.

The machine as so far described operates in the following manner once the machine is operating with a bale being formed within bale-forming compartment 50. Material to be baled is fed, more or less continuously, to the infeed section 44a of auger housing 44 and that material is transferred by auger 32 rearward through conveying section 44b into the bale forming compartment 50. As the material is transferred into the bale forming compartment 50, it passes between the compacting rollers 40, 41 into compartment 50 off the inward (rearward) ends of the auger conveyor flights 36, 37. The inward ends of the conveyor flights 36, 37 distribute the material in a more or less spiral manner onto the forward end of the bale being formed in compartment 50. Because of the resistance to rearward movement caused by resistance means 54, the material distributed off the inner ends of conveyor flights 36, 37 is contacted by the compacting rollers 40, 41, thereby being rolled and compacted against the forward end of the bale that is being formed. These rollers 40, 41, being mounted on the rotating auger 32, rotate with auger 32, and the surfaces of the rollers roll against the material as it leaves the rearward ends of the auger flights 36, 37 to distribute it uniformly across the forward end of the bale being formed in a spiral manner. The rollers 40, 41, being frusto-conical, create a convex compaction surface on the forward end of the bale within compartment 50. The rollers 40, 41 lay the material onto the convex compaction surface in spiralled layers. As additional material is fed rearwardly by the conveyor auger 32, rollers 40, 41 will continue to distribute and lay that material onto the convex compaction surface thereby adding to the bale as it is being formed. As the material is added to the bale and compacted by rollers 40, 41, the compacting force will override the resistance means 54 and the compacted material will be translated rearwardly through compartment 50 into compartment 60.

As the compacted material's rearward end is translated rearwardly of the infeed section 60a of compartment 60, baling twine or wire will be picked up by that rearward end and carried rearwardly with the compacted material until enough compacted material is contained within the bale binding section 60b to make up a finished bale. Then, the material dividing means 62 is engaged to separate the compacted material within compartment 50 from the material in binding section 60b, and bale tying means is engaged to tie the twine or wire about the compacted material within the binding section 60b.

During the short time during which the twine or wire tying operation takes place, on the order of 2–3 seconds, the movement of the rearward end of the compacted material within compartment 50 is halted. Because the material is compressible, however, that temporary halt of movement at the rear end of the bale being formed does not interfere with the transfer of material from auger 32 to the forward end of the bale being formed. Thus, the present invention is characterized by permitting the continuous feeding of material into the machine with no interruption as discrete bales are separated and tied. When the tying operation is completed, the material dividing means 62 is inactivated, thereby permitting the rearward end of the bale being formed in compartment 50 to be translated rearwardly through the infeed section 60a of compartment 60 and into contact with the forward end of the finished bale that had just been tied with twine or wire. Thereafter, the delivery of material to the convex compaction surface by compacting rollers 40, 41 will cause the compacted material and the tied and finished bale to be translated as a unit rearwardly. Continued translation of compacted material will cause the tied and finished bale to be discharged from the rearward end of the machine and enough new material to be translated through the binding section 60b of compartment 60 until the material dividing means is actuated once again, followed by actuation of the bale tying means to produce another tied and finished bale.

The continuing rotation of the auger-mounted rollers 40, 41 effects a continuous compaction of the material as it is translated off the rearward ends of the auger flights 36, 37. As a consequence, the material is uniformly compacted throughout the bale as the bale is formed. Because the compacting action of the rollers 40, 41 also effects a spiral laying-in of the material during the compaction process, the resultant bale consists of a multiplicity of wafers, each of which is on the order of about 1 inch thick. This is to be contrasted with a bale resulting from a conventional plunger-type baler which will a have series of wafers that are each 4 inches or more thick. Whereas in a plunger-type baler where the material is pressed into the bale in any which direction (usually crumpled lengthwise), the compaction of material by the present invention into spiral layers tends to lay the material with the material stems (in the case of fibrous material such as hay or straw) layered in a somewhat coplaner pattern. Consequently, delicate material such as alfalfa hay can be compacted into bales by the present invention with much less leaf-stem separation and, hence, much less leaf loss.

It has been discovered that the rotary compaction of hay effected by the present invention not only keeps the individual plant's components intact, but also crushes the plant stems slightly in a direction transverse to the plant stem's longitudinal extent, thereby making the hay more palatable to livestock. Conventional baling machines do not produce this desirable effect. For example, it is common in large scale cattle feeding operations to open up numerous bales of hay and then run tractors through and across the open bales to crush the hay to make it more palatable. This approach to crushing hay bales is time consuming and wasteful inasmuch as the leafs, in the case of alfalfa hay, are separated from the hay stems. Bales produced by the present invention are opened by these same cattle feeding operations and fed "as is" without any such "physical conditioning" and with less waste because the hay is more palatable just as it come from the bale.

Figure 13:
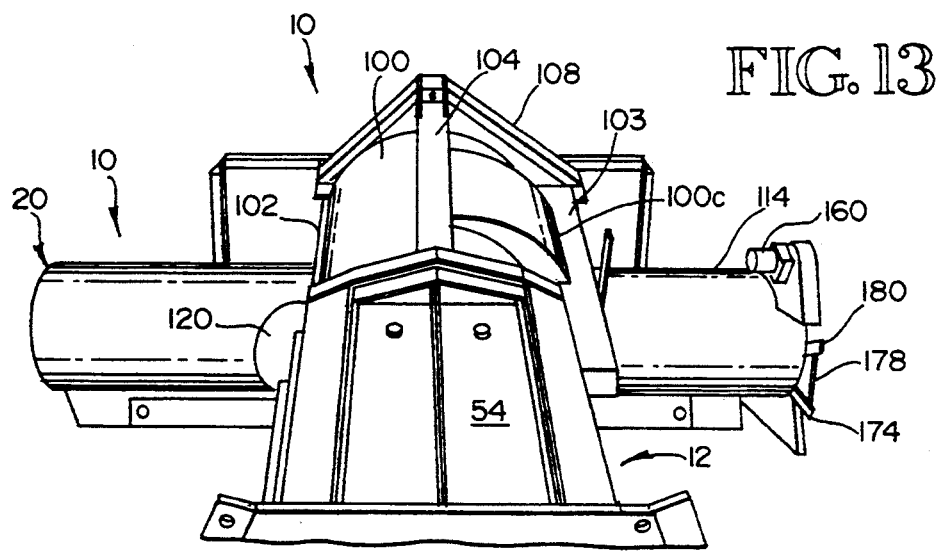
FIG. 13 is a top view in perspective of the front end of the FIGS. 1-2 baler.
Figure 14:
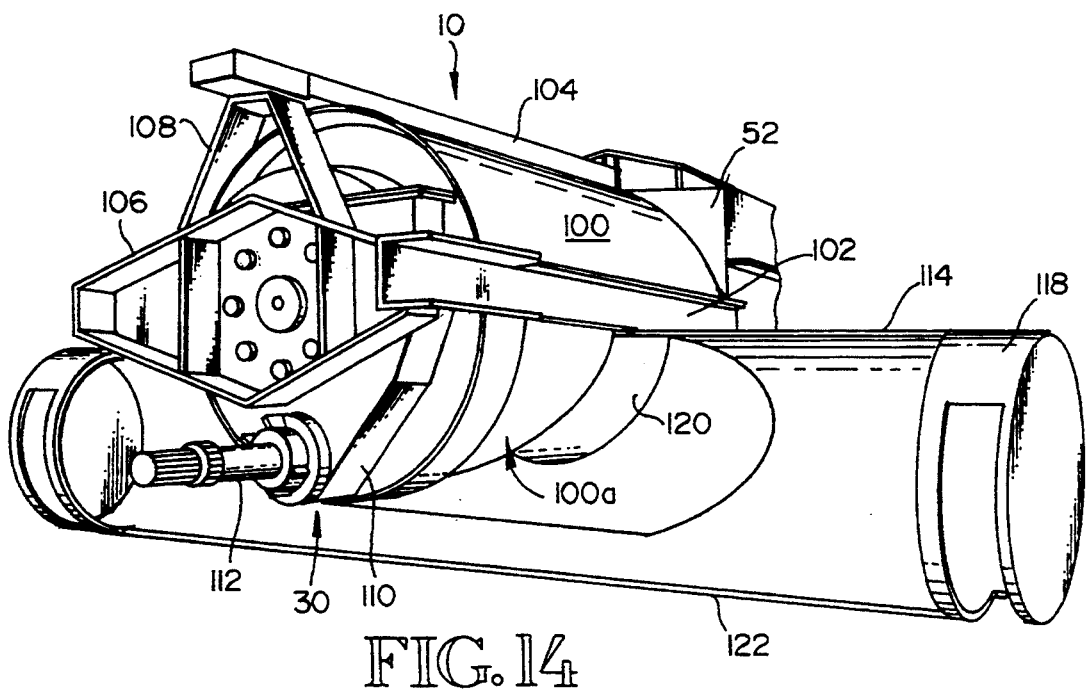
FIG. 14 is a partial view in perspective of the front end framework and superstructure of the FIGS. 1-2 baler.
Figure 15:
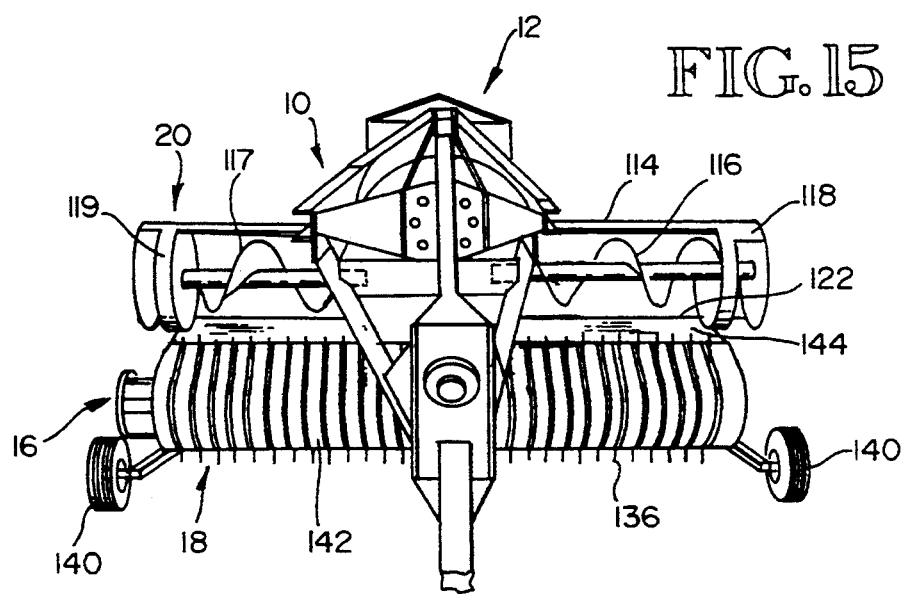
FIG. 15 is a front end view in perspective of the FIGS. 1-2 baler.

As seen in FIGS. 1-15, the auger feeding means 10 of this invention preferably comprises a cylindrical auger housing 100 that is mounted within and carried by left, right and top longitudinal reinforcing beams 102, 103, 104. The front ends of the side beams 102, 103 are rigidly joined to a front, transverse mounting block 106, and the front end of top beam 104 is rigidly jointed to mounting block 106 through an A-frame member 108. Between the front head of the auger housing 100 and mounting block 106, rotary drive means 30 is mounted. Rotary drive means 30 comprises a gear box 110 containing an appropriate gear train for rotating auger 32 at the desired speed as a result of the rotary input from drive shaft 112. The forward end of auger shaft 34 extends through the gear box 110 and is journal mounted within mounting block 106 such that the auger 32 is supported in cantilever fashion therefrom. Viewed from the front end, the auger 32 rotates clockwise. To facilitate the introduction of hay or the like into the infeed section 100a and pickup by the auger flights 36, 37, the housing 100 is flared outward and downward in the upper left quadrant as shown at 100c (FIG. 3 and 13). The lower half, or belly, of the auger housing is cut-away to provide the material infeed section 100a, as shown in FIGS. 3 and 14. This infeed section is immediately adjacent the gearbox 110 and extends rearwardly a sufficient length (designated 44b in FIG. 1) to enable the auger 32 to contact and carry the material up into the auger housing 100. The length of the auger housing conveying section (44b in FIG. 1 and 100b in FIG. 11) need only be of a length sufficient to transport the material rearwardly into the bale forming means 12. In the embodiments shown, the infeed section, 44b or 100b, is about ⅔ of the length of the auger housing and the conveying section is about ⅓ of the length of the auger housing.

Figure 11:
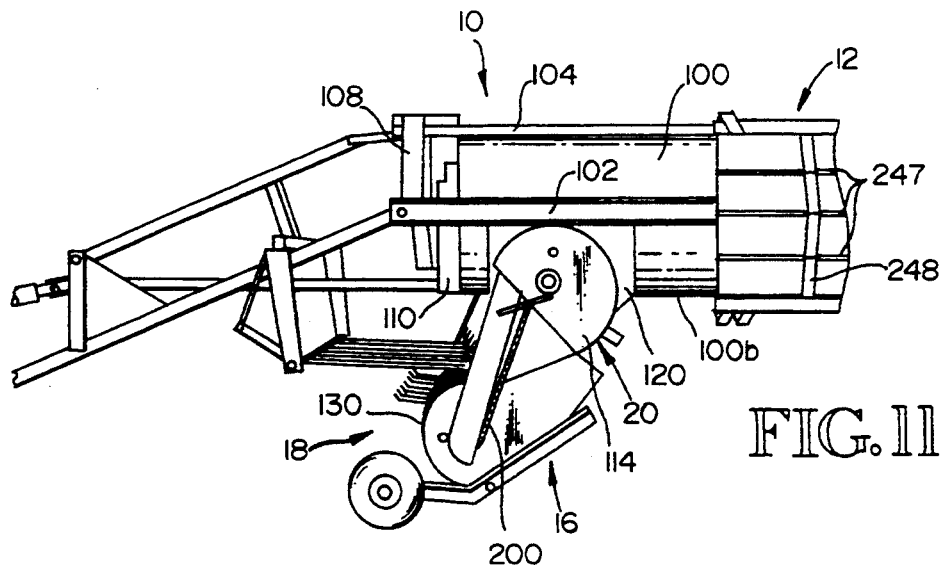
FIG. 11 is a left side view in perspective of the front end of the FIGS. 1-2 baler.
Figure 12:
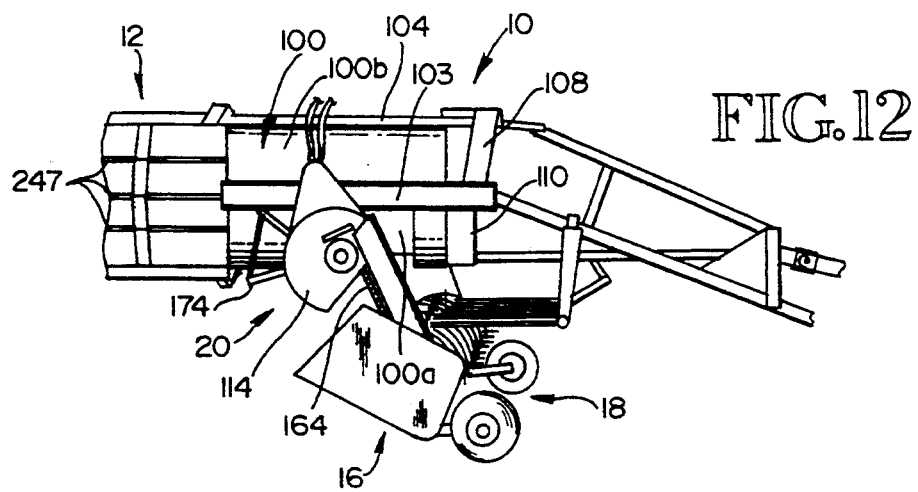
FIG. 12 is a right side view in perspective of the front end of the FIGS. 1-2 baler.

As seen in FIGS. 11-15, the header means 20 of the bulk material charging means 16 comprises a cylindrical header housing 114 that is mounted to the underside of the infeed section 100a of the auger housing 100 such that housing 114 extends perpendicularly to the longitudinal axis of the baling machine. The longitudinal length of housing 114 is substantially greater than the transverse width of the main body of the baling machine. Left and right header augers 116, 117 are rotatably mounted by the left and right end mounting sections 118, 119 of housing 114 such that the augers are cantilevered toward the longitudinal center of the machine. The inner ends of the augers 116, 117 terminate within the space defined by the housing infeed section 100a. The header housing 114 is cut-away toward the front to expose the augers 116, 117 to the pick up means 18. At the rear midsection 120 of the header housing 114, the header housing funnels rearwardly to provide a tapered rear transition section from the header housing 114 to the material conveying section 100b as seen in FIGS. 11, 13 and 14. The transition midsection 120 is tapered as shown in FIGS. 11 and 13 on the other side of the machine also; the orientation of the machine in FIGS. 12 and 13, for example, hides the fact that this transition midsection 120 is symmetrical about the longitudinal axis of the baling machine. The header augers 116, 117 are transversely oriented (with respect to the longitudinal extend of the baling machine) and are interconnected by a header drive means such that they rotate in unison to transversely convey bulk material inward toward and into the infeed section 100a for contact with the longitudinally-oriented feeding auger 32. The transverse axis of the header housing 114 is the rotation axis of the header augers 116, 117. This header housing axis is located at an elevation below the axis of the feeding auger 32 such that the lower edge 122 of header housing 114 extends continuously below the infeed auger housing 100 as shown in FIG. 14.

As shown in FIGS. 11-13 and 15, the pick up means 18 comprises a rotatable cylinder 130 located at the forward end of the baling machine and supported by a transverse shaft 132. Shaft 132 is rotatably mounted in a wheeled pick up carriage 134 such that cylinder 130 just clears the ground. A plurality of radially-oriented pick up fingers 136 are mounted to cylinder 130 to assist in lifting up bulk material such as hay or straw (as from a windrow) as the baling machine is towed across a field. Cylinder 130 is rotatably interconnected by header drive means with the header augers 116, 117 such that material will be lifted by the rotating pick up fingers and conveyed rearwardly into the header housing 114, across the top of cylinder 130. Once the material is within the header housing 114, header augers 116, 117 convey the material transversely inward toward and into the infeed section 110a for engagement by the feeding auger 32. The pick up carriage 134 is pivotally mounted to the header housing 114 by left and right brackets 138, 139 (FIGS. 16 and 17) so that the pick up means 18 may adjust to varying terrain as the carriage ground-engaging wheels 140 travel along the field. Pick up means 18 also includes a transversely-elongated cover 142 that encloses at least the bottom, front and top of the pick up cylinder 136 to provide a surface over which the pick upped material will slide as it is transported rearwardly into the header housing 114. Cover 142 is slotted so that the pick up fingers 136 can protrude therethrough. An apron 144 connects the rearward edge of cover 142 to the bottom edge of header housing 114 so that material transported from the pick up means 18 to the header means 20 will not fall out between the two.

Figure 16:
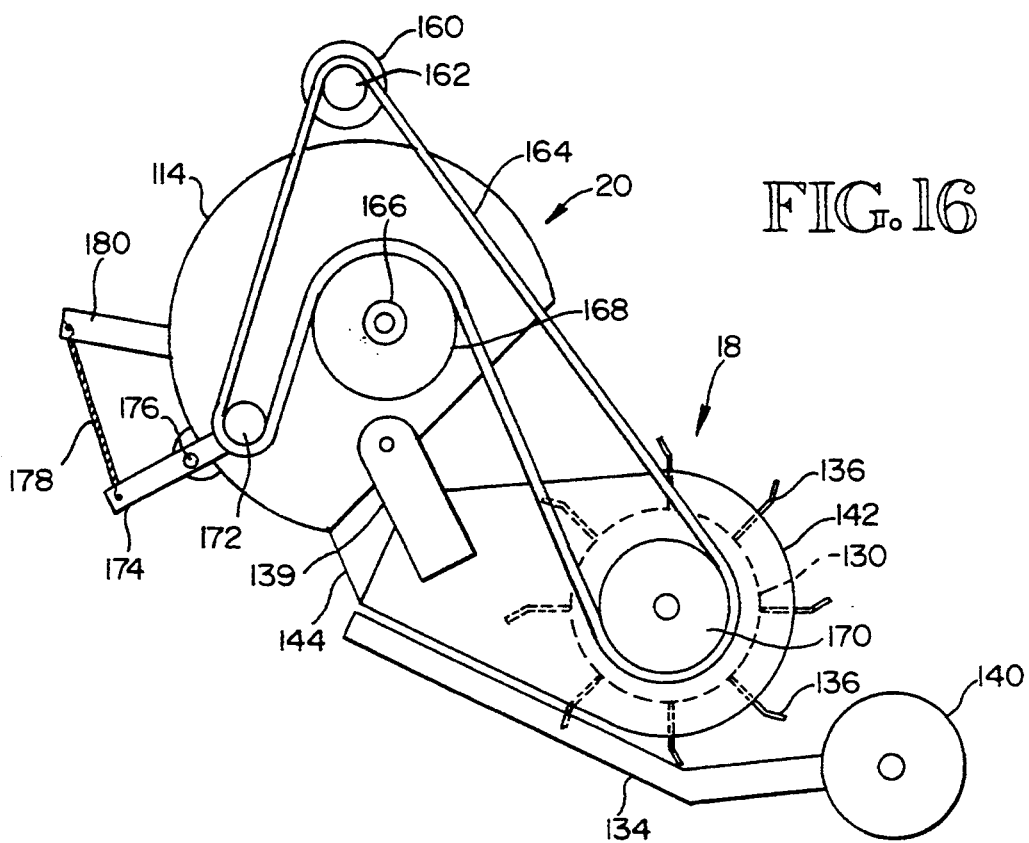
FIG. 16 is a side elevation view of the right side chain drive mechanism associated with the header assembly of the FIGS. 1-2 baler.
Figure 17:
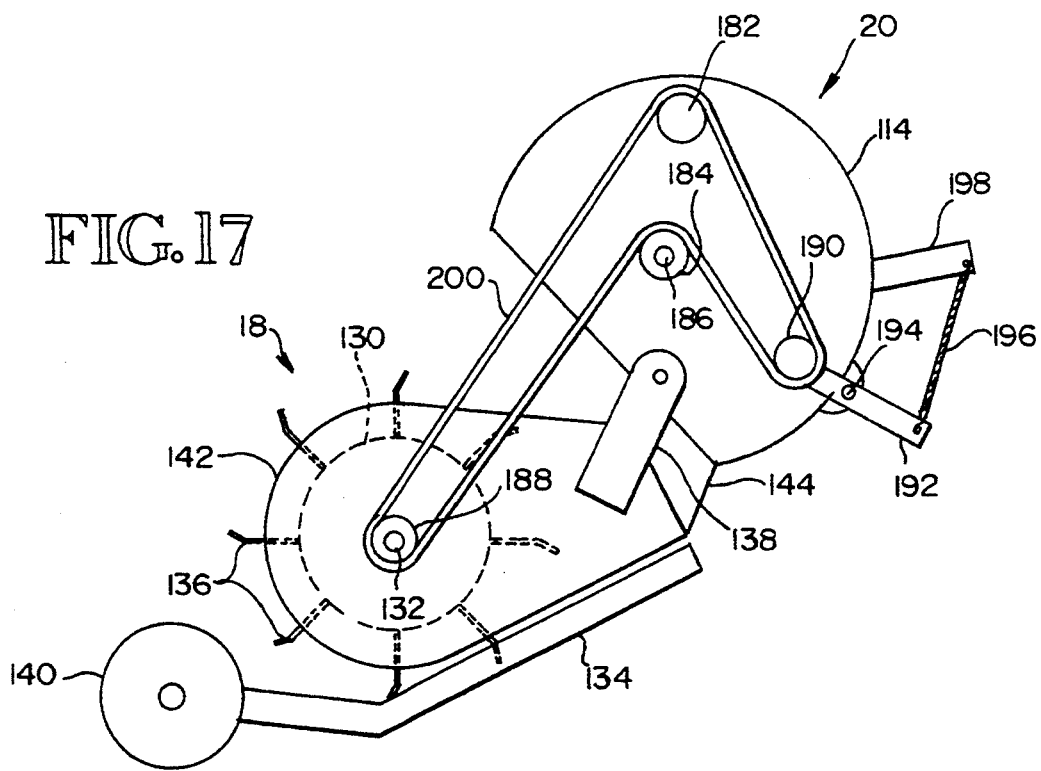
FIG. 17 is a side elevation view of the left side chain drive mechanism associated with the header assembly of the FIGS. 1-2 baler.

A header drive means is provided to operate the header augers 116, 117 and the pick up cylinder 134. As shown in FIGS. 16 and 17 in particular, this header drive means comprises a hydraulic motor 160 mounted on the right end of header housing 114. The shaft of motor 114 has a drive chain sprocket 162 mounted thereon to engage a drive chain 164. The right end of header auger 117 is provided with a drive shaft 166 that mounts a drive sprocket 168 also engaged with drive chain 164. The right end of pick up cylinder shaft 132 mounts a drive sprocket 170 that is engaged with drive chain 164. A right hand chain-tightening idler sprocket 172 is mounted by a spring-biased pivot arm 174 that is pivotally attached at 176 to header housing 114. Pivot arm 174 is biased by a coil spring 178 that is anchored to the housing by a bracket 180. Drive chain 164 is reeved around sprockets 162, 170 and 172 and is reeved over sprocket 168 as shown in FIG. 16. Idler sprocket 172 is spring biased to maintain tension in drive chain 164 as the relative distance between pick up carriage 134 fluctuates during operation of the machine over varying terrain. The foregoing-described drive mechanism is duplicated, excepting the hydraulic motor, on the left end of the left header auger 116 and the left end of pick up cylinder 130 as shown in FIG. 17. This left end mechanism comprises an idler sprocket 182 mounted to the left end of header housing 114, a drive sprocket 184 mounted to the left end of a drive shaft 186 extending from the left header auger 116, a drive sprocket 188 mounted to the left end of pick up cylinder shaft 132, and a spring-loaded idler sprocket 190 mounted on a pivot arm 192. Pivot arm 192 is pivotally-attached at 194 to the left end of header housing 114 and is spring biased to a chain-tightening position by a coil spring 196 that is anchored to the header housing 114 by a bracket 198. A left end drive chain 200 is reeved around sprocket 182, 132 and 190, and is reeved over sprocket 185.

This header drive means operates as follows when hydraulic motor 160 is turned on. Motor drives the right end drive chain 164 to rotate the right header auger 117 clockwise and the pick up cylinder 130 counter-clockwise as seen in FIG. 16. The rotation of pick up cylinder drives the left end drive chain 200 to rotate the left end auger 116 counter-clockwise as seen in FIG. 17. Hydraulic motor 160 would be connected by appropriate hydraulic hoses to the hydraulic pumping system of the pulling tractor in the customary manner. The flights of the header augers 116, 117 are appropriately oriented to convey the picked up material laterally toward the center of the header housing 114 for contact with the feeding auger 32.

The means 54 for applying compressive force to a bulk material being formed in the bale forming compartment 50 is shown in FIGS. 2, 5 and 6. This means 54 comprises a pair of opposed, top and bottom reinforced panels 210, 211 that are pivotally mounted at 212, 213, respectively, to the forward ends of the top and bottom of walls 214, 215 of compartment 50. Compression panels 210, 211 are elongated and extend from near the forward end of compartment 50 to the rearward end thereof. The rearward ends of panels 210, 211 are respectively attached to upper and lower cross bars 216, 217 that are coupled together by left and right hydraulic cylinder 218, 219. The cylinder ends of the cylinders 218, 219 are respectively pivotally attached at 220, 221 to top cross bar 216 and the rod ends of cylinders 218, 219 are respectively attached at 222, 223 to bottom cross bar 217. Cylinders 218, 219 are appropriately coupled together by hydraulic hosing and by a tractor-mounted hydraulic control system such that the cylinder rods 224, 225 may be drawn into their respective cylinders to simultaneously pivot compressing panels 210, 211 into the interior of bale forming compartment 50. When compression panels 210, 211 extend into compartment 50, they provide a restriction to rearward movement of a bale being formed therein. Because the compression panels 210, 211 are elongated and pivoted from near the forward end of compartment 50, they provide an increasing resistance as the bulk material is translated rearwardly. The hydraulic system pressure serving cylinders 210, 211 may be adjusted to provide a predetermined degree of inward compression force that the rearwardly-moving bulk material must overcome as it is translated rearwardly. The pivoted forward ends of panels 210, 211 are spaced rearwardly from the forward end of compartment 50 such that there is sufficient space between the forward end of the panels and the compacting rollers 40, 41 for the cross-section of the bale to become established. When the bulk material leaves the rearward ends of panels 210, 211, it is substantially compressed due to having been forced through the restricted area provided at the end of the panels. This compressed bulk material is translated rearwardly into the bale binding compartment 60. As it enters compartment 60, the compressed bulk material will substantially maintain its compressed state as a consequence of the force exerted by compressed bulk material still in compartment 50 and as a consequence of being forced against baled material within compartment 60.

Figure 9:
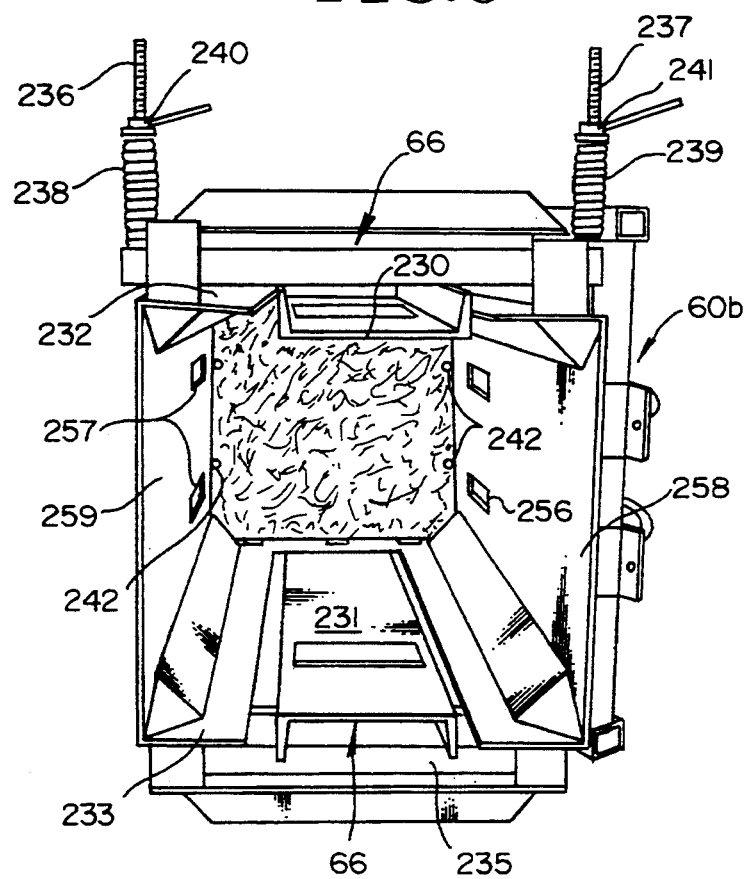
FIG. 9 is another partial view in perspective of the rear end of the FIGS. 1-2 baler illustrating bale-compressing means used to maintain the hay in a compressed state during a bale-tying operation.
Figure 10:
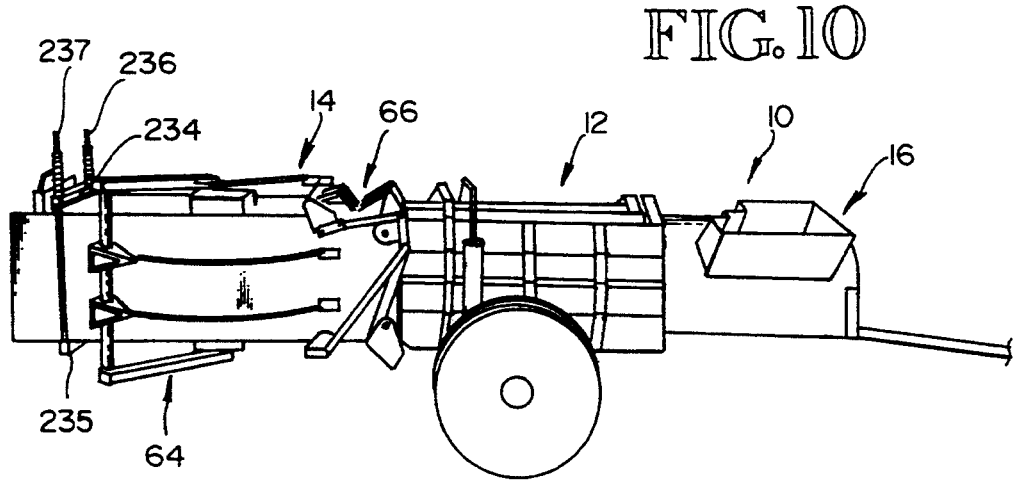
FIG. 10 is a side view of a variation of the FIGS. 1-2 baler illustrating its adaptation to manual loading of material for baling.

As bulk material from compartment 50 is translated rearwardly through the bale binding compartment 60, means 66 for applying compressive force to the bulk material within compartment 60 establishes a resistance to rearward bulk material travel. Means 66 is similar to means 54 in form and function. Means 66 comprises top and bottom compression panels 230, 231 that are pivotally mounted to the top and bottom walls 232, 233 of compartment 60 near the forward end of the bale binding section 60b as at 230 with respect to top panel 230 (FIG. 6). Panels 230, 231 are elongated and extend from near the forward end of compartment 60b to the rearward end thereof. The rearward ends of panels 230, 231 are respectively attached to upper and lower cross bars 234, 235 that are coupled together by left and right threaded tie rods 236, 237 (FIGS. 9 and 10). Tie rods 236, 237 respectively mount left and right coil springs 238, 239 to resiliently urge panels 230, 231 toward one another. The compressive force on panels 230, 231 is adjusted by left and right nuts 240, 241. These tie rod assemblies could be replaced by hydraulic cylinder assemblies of the type employed with means 54 as heretofore described. Typically, panels 230, 231 would exert less compressive force in compartment 60b than panels 210, 211 exert in compartment 50.

Figure 7:
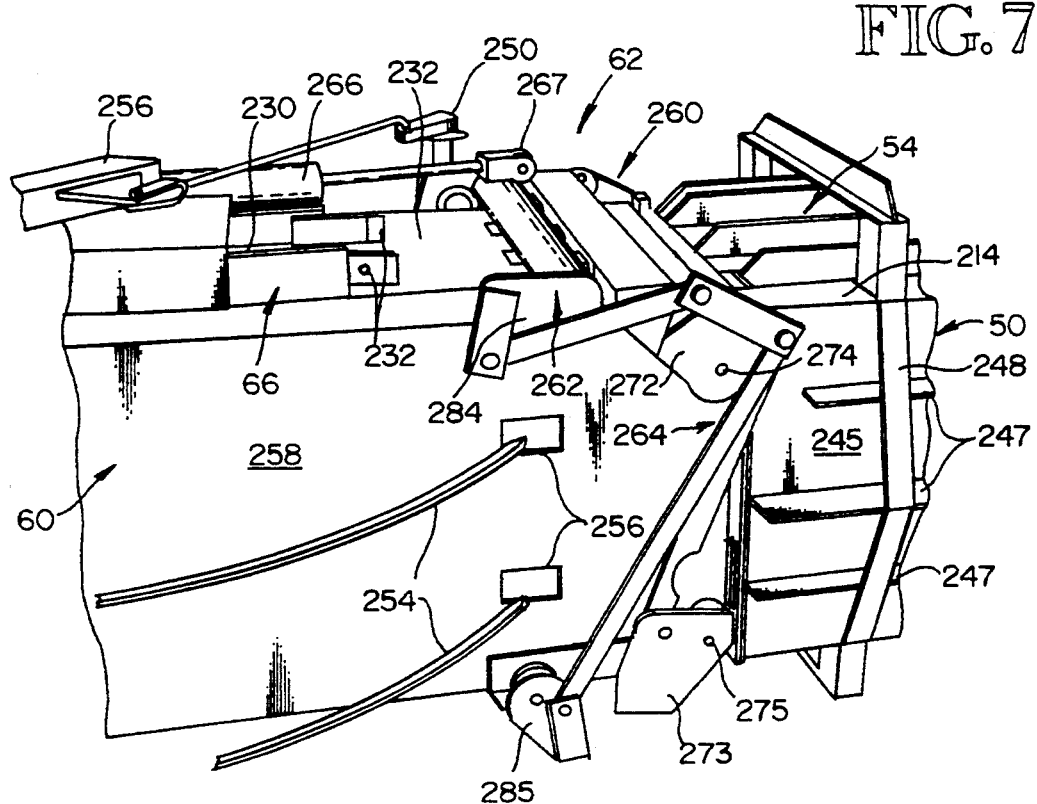
FIG. 7 is a partial side view of the FIGS. 1-2 baler in perspective illustrating the FIG. 6 hay-dividing mechanism in an activated position.

When sufficient bulk material has been translated into the binding section 60b of bale binding compartment 60, the bulk material is tied into a finished bale. In the tying operation, bulk material dividing means 62 and bale tying means 64 are actuated. Dividing means 62 separates the bulk material so that tying means 64 can function without interference from bulk material within compartment 50. Tying means 64 comprises means 250 providing a supply of binding twine or wire, and knotting means 252 for tying bulk material within bale binding section 60b into a finished bale. Means 64 and its supply means 250 and knotting means 252 are conventional and operate in a conventional manner. They are mounted on compartment 60 as shown in FIGS. 1, 2 and 7. Knotting means 252 includes a pair of knotting needles 254 mounted on a swing arm 256 such that, at the appropriate time, needles 254 may be swung through right and left apertures 256, 257 in the right and left side walls 258, 259 of compartment 60; first in through the right apertures 256, across through the compartment and out through the left apertures 257. Means 250 and 252 provide for a pair of strands of binding twine or wire to be fed through the outer ends of needles 254, through right apertures 256, across, compartment 60, and out through left apertures 259. As bulk material is translated from the infeed section 60a of compartment 60 into section 60b, the bulk material picks up the binding strands and carries them rearward such that the binding strands extend from the right apertures 256, back along the right side wall 258, around the rearward end of the bulk material, forward along the left side wall 259 and out through the left apertures 257. When the bulk material within section 60b is to be tied into a finished bale, dividing means 62 creates a gap between the forward end of the material within compartment 60b and the rearward end of the material still within compartment 50 (see FIGS. 18 and 19). Then needles 254 extend through the apertures 256, 257 to carry the binding strands across the forward face of the bulk material in section 60b and tie them off at the supply means 250. The binding strands now completely encircle a section of the bulk material within section 60b thereby delineating a finished bale. Needles 254 are then retracted back to the position shown in FIGS. 1 and 2, leaving a pair of binding strands extending from supply means 250, through left apertures 257, across compartment 60 and out through right apertures 256 and into the outer ends of needles 254. Thereafter, dividing means 62 is inactivated and additional bulk material is translated into section 60b for repetition of the bale binding process.

The bulk material is highly compacted during the bale-forming operation of the machine. To facilitate the passage of strands of binding twine or wire around the compacted bulk material when it is translated through compartment 60, a plurality of elongated rods 242 are secured to the left and right sides walls 244, 245 of compartment 50. As shown in FIGS. 5, 6, 8, 18 and 19, each rod 242 is aligned with the longitudinal center of an aperture 256, 257. As bulk material is translated past these rods 242, a semi-circular channel is created in the sides of the bulk material. Because of the arrangement of the rods 242, these elongated channels will receive the binding strands 246. Because of the high compression forces experienced in compartment 50, the side walls 244, 245 are reinforced with a plurality of elongated longitudinal ribs 247. These ribs 247 are themselves reinforced with multiple transverse bands 248.

Figure 8:
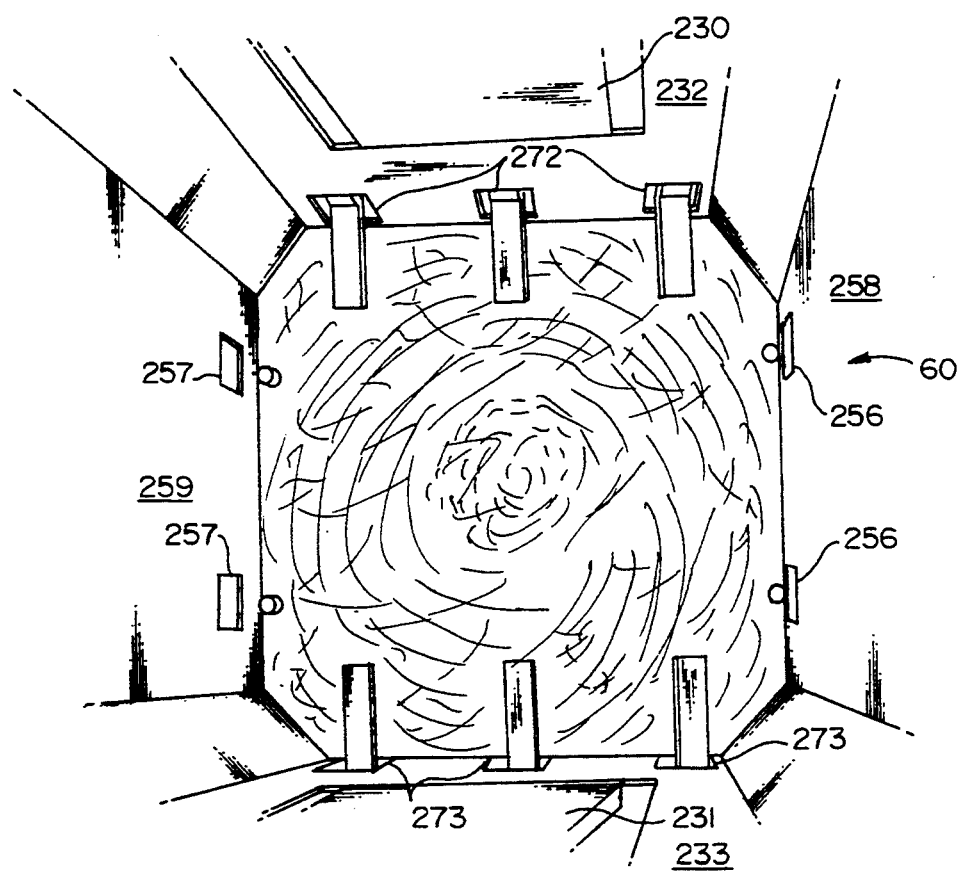
FIG. 8 is a partial view in perspective of the inside of the FIGS. 1-2 baler, illustrating the internal position of hay dividing members when the hay-dividing mechanism of FIGS. 6-7 is activated.

As shown in FIGS. 6–8, material dividing means 62 comprises a restraining means 260 for blocking rearward translation of bulk material in compartment 50 into infeed section 60a, a separating means 262 for separating the forward end of bulk material within section 60a and pushing it rearwardly so as to create a gap within which knotting needles 254 may be inserted during a bale tying operation. Restraining and separating means 260, 262 are kinematically linked by appropriate linkage means 264 so that they may be operated in unison by actuating means 266.

Restraining means 260 comprises (see FIGS. 18–19) top and bottom sets of a plurality of material-separating fingers 268, 269 that are mounted on top and bottom cross bars 270, 271. The top and bottom cross bars are pivotally mounted by pairs of left and right mounting plates 272, 273, the pivot points 274, 275 being eccentric of the axis of the cross bars. When the top and bottom cross bars are rotated (with respect to FIG. 6: top cross bar counterclockwise; and bottom cross bar clockwise) to extend the dividing fingers 268, 269 into the compartment 60, the cross bars are translated rearwardly as they are rotated such that the fingers 268, 269 are inserted into compartment 60 substantially vertically. Fingers 268, 269 extend substantially tangentially outward from their respective cross bars. When fingers 268, 269 are inserted into compartment 60, they extend through top and bottom apertures 272, 273 respectively in the top and bottom walls 232, 233 of compartment 60, engage the top and bottom portions of the rearwardly-moving bulk material within compartment 50, and stop rearward movement of that bulk material.

Separating means 262 (see FIGS. 18–19) comprises top and bottom sets of a plurality of material-separating fingers 280, 281 that are mounted on top and bottom cross bars 282, 283 from top and bottom tangential arms 278, 279. The top and bottom cross bars are pivotally mounted by pairs of left and right mounting plates 284, 285, the pivot points 286, 287 being eccentric of the axis of the cross bars. When the top and bottom cross bars are rotated (with respect to FIG. 6: top cross bar clockwise; and bottom cross bar counterclockwise) to extend the dividing fingers 280, 281 into the compartment 60, the cross bars are translated rearwardly as they are rotated such that the fingers are inserted into compartment 60 through apertures 272, 273 in an arc. When the fingers 280, 281 are inserted into compartment 60, they engage the top and bottom portions of the rearward end of the bulk material within compartment 60a and push that material rearwardly so as to open up a space between the rearward face of the bulk material in compartment 50, that is being restrained by the fingers 268, 269 of restraining means 260, and the forward face of the bulk material within section 60b of compartment 60, that has been pushed rearwardly by the fingers 280, 281 of separating means 262.

Levers and linkages, comprising linkage means 264, are provided on the left and right sides. These levers and linkages connect the mounting plates 284 and 272 to one another and to mounting plates 273, 285 such that they pivot in unison about their respective pivot points. Actuating means 266 is preferably a hydraulic cylinder having its cylinder end pivotally mounted to the top wall 232 of compartment 60 and its rod end pivotally attached to an actuating lug 267. When the rod of cylinder 266 is extended, the dividing fingers are inserted into compartment 60. When the rod of cylinder 266 is retracted, the fingers are retracted from compartment 60. Appropriate timing means would interrelate the actuation of cylinder 266 with the operation of the bale tying means 64 to properly sequence the bulk material separating and bale tying processes.

Figure 18:
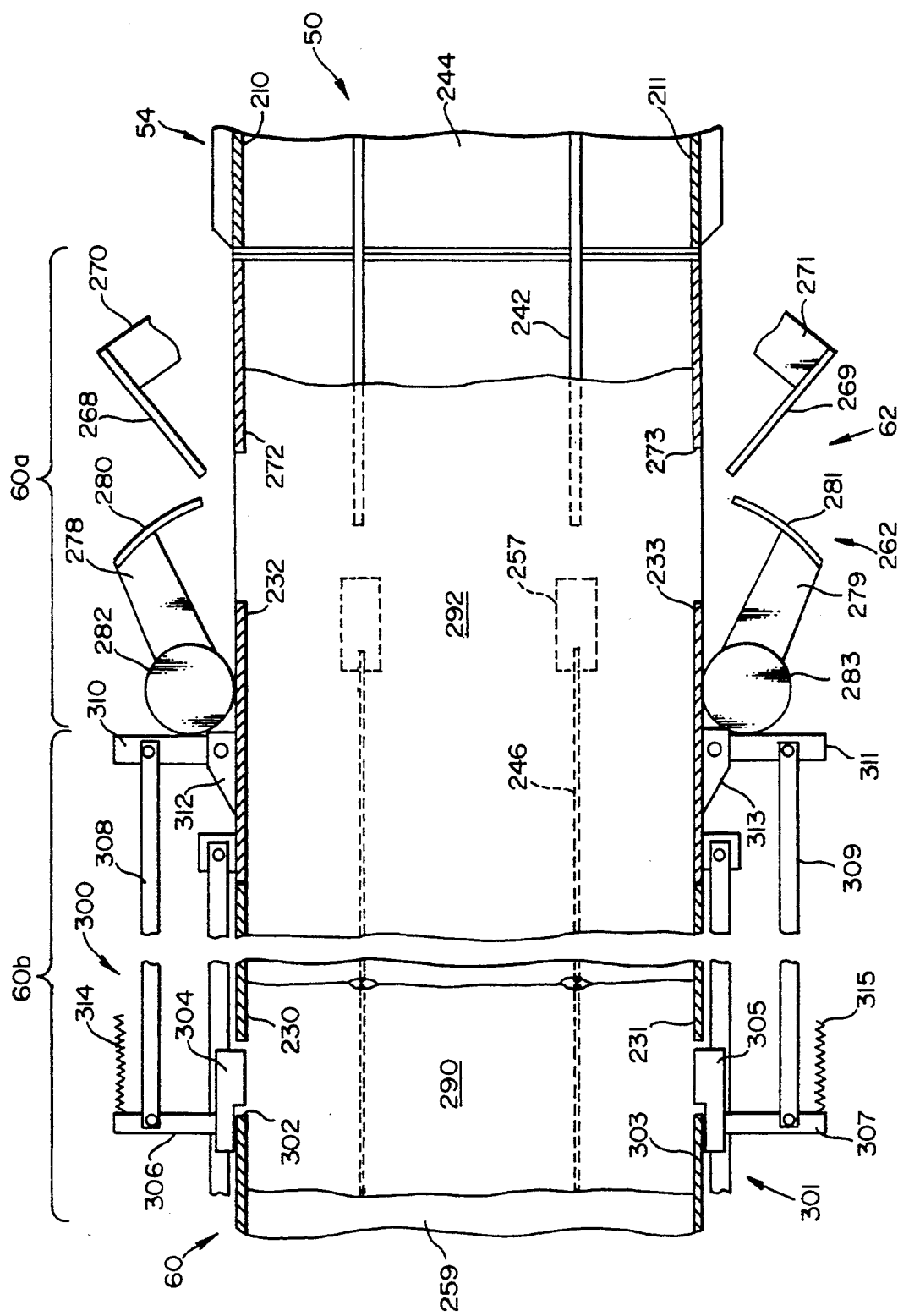
FIG. 18 is a partial elevation view in cross section through the bale-forming and bale-tying sections of the FIGS. 1-2 baler illustrating a tying bale-compression means in an inactivated position.
Figure 19:
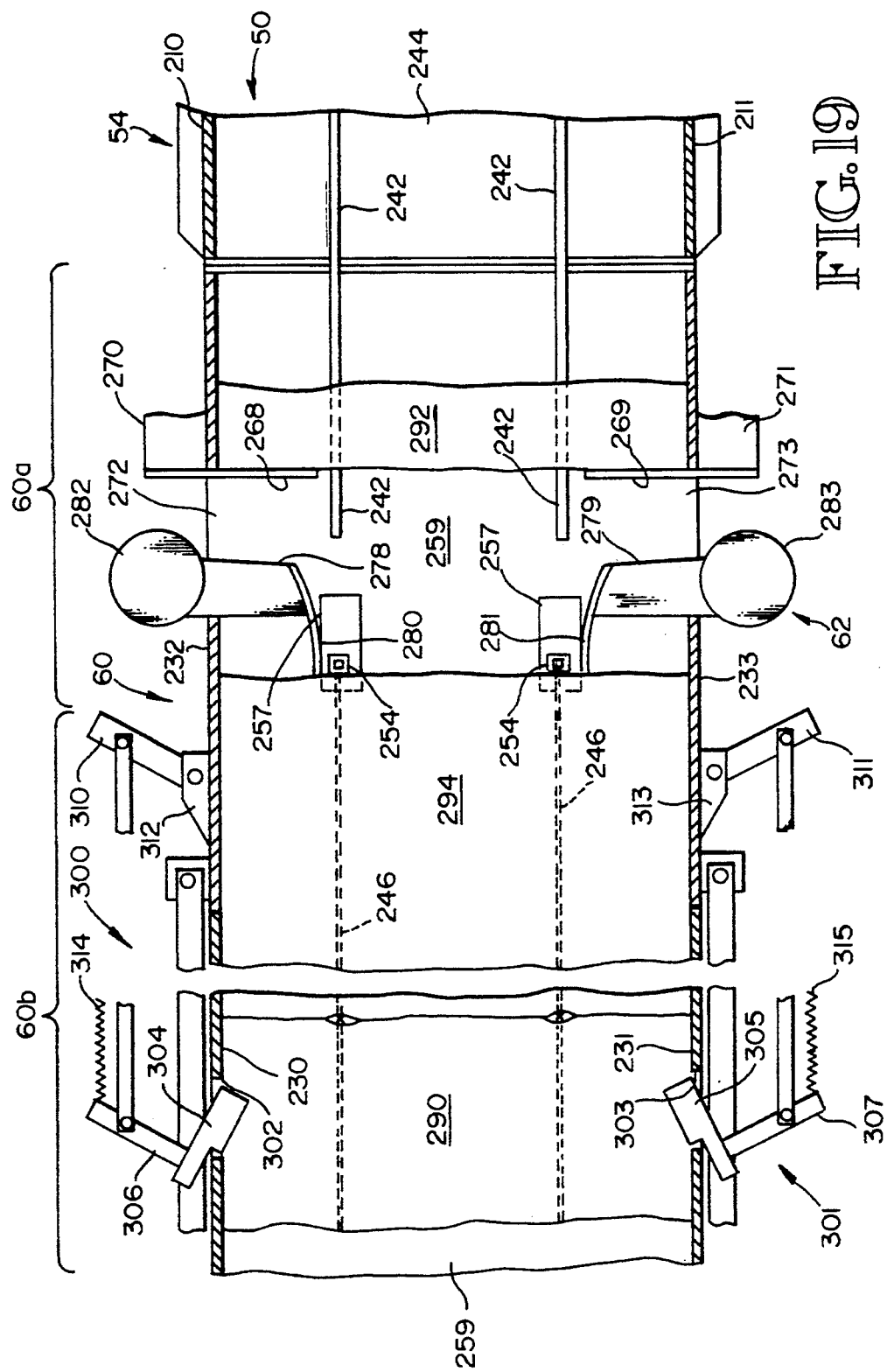
FIG. 19 is a partial elevation view in cross section of the FIG. 18 tying bale-compression means in an activated position.

With respect to the top and bottom sets of restraining and separating means' fingers, 268-269 and 280-281, their relative positions before and after actuation are shown in FIGS. 18 and 19 (FIG. 18: before; FIG. 19: after). The bottom sets of restraining and separating means' fingers are identical and operate identically and in unison therewith. As shown in FIGS. 18 and 19, fingers 268 and 280 enter section 60a of compartment 60 through apertures 272 at almost the same point. Fingers 268 enter substantially vertically to pierce the mass of bulk material being translated rearwardly. At their point of insertion, fingers 268 stop further rearward movement of bulk material that is forward thereof in compartment 50. Fingers 280 also pierce the mass of bulk material at about the same point as fingers 268 and then push the bulk material rearwardly of the point of insertion. As shown in FIGS. 18 and 19, fingers 269 and 281 enter section 60a of compartment 60 through apertures 273 at almost the same point. Fingers 269 enter substantially vertically to pierce the mass of bulk material being translated rearwardly. At their point of insertion, fingers 269 stop further rearward movement of bulk material that is forward thereof in compartment 50. Fingers 281 also pierce the mass of bulk material at about the same point as fingers 269 and then push the bulk material rearwardly of the point of insertion. Thus, as seen in FIG. 19, the side wall apertures 256 are exposed so that the knotting needles may be inserted through the binding compartment to complete the bale tying operation. Dividing means 62 and tying means 64 operate in a timed manner so that the knotting needles are actuated promptly after the bulk material has been separated. The bulk material separating and bale tying operations take a total of about 2-3 seconds. Thus, the time interval during which rearward movement of bulk material within compartment 50 is affected is negligible. Even though the rearward face of the bulk material in compartment 50 is stopped, the bulk material has sufficient compressibility that material can be fed into the forward end of compartment 50 by auger feeding means 10, for the short time interval required for bale binding, without jamming.

FIG. 19 depicts to forward end of a completed and tied bale 290 and a continuous mass of bulk material 292 extended from the bale-forming compartment 50 and through the infeed section 60a of bale-tying compartment 60 and into the bale-tying section 60b. The untied mass of material 292 abuts the forward end of tied bale 290 and the mass of material 292, as it is translated rearwardly, pushed the tied bale 290 rearwardly until it is discharged from the back end of the machine. When the mass of material 292 within the binding section 60b is sufficient to make up another finished bale, material dividing means 62 and bale tying means 64 are activated as previously described. FIG. 19 depicts the result. In FIG. 19, the heretofore continuous mass of bulk material has had another bale 294, of which the forward end is depicted, subdivided off. At the instant that another bale 294 is subdivided off and tied into a finished bale, as depicted in FIG. 19, the remaining continuous mass of bulk material is held in compartment 50 by restraining means 260 as previously described. The segment of bulk material that was divided off the rearward end of the continuous mass of bulk material 292 (see FIG. 18) was separated off by separating means 262 and compressed rearwardly into a shorter, more compact, form as shown in FIG. 19. This segment of material, by the operation of separating means 262, was compressed the distance from the forward edge of the top and bottom apertures 272, 273 to the rearward-most position of the actuated separating means fingers 280, 281 as shown in FIG. 19. Because of this compression and shortening of the material to be tied into the other bale 294, when the binding strands 246 are tied off and separated to produce another finished bale, it is assured that the binding strands 246 will remain taut. When the bale 294 is eventually discharged from the machine, the additional compaction that bale 294 experienced during the bale tying operation just described will cause a tensile force to be induced in the binding strands as the bale tends to expand. Consequently, the bale 294, when no longer under the compaction forces present within the machine, will remain tightly compacted by the encircling binding strands 246. If the bale 294 did not undergo the additional compaction as above-described, the binding strands 246 might not hold the bale tightly together inasmuch as these strands are made of elastic material (either wire of twine) that will stretch somewhat. By additionally compacting the bale 294 just before it is tied, the natural tendency for the bale 294 to expand after it is released from the machine will tighten the binding strands 246, thereby maintaining the integrity of the bale.

In order for this additional compaction of bale 294 to occur, just prior to binding, there must be sufficient rearward resistance to movement to enable the additional compaction to take place without merely shifting the entire bale unit rearwardly under the force exerted by separating means fingers 280, 281. If the result of actuating separating means fingers 280, 281 from their FIG. 18 position to their FIG. 19 position was simply to translate the bulk material rearwardly as a unit, not enough additional compaction of that material would occur. The result would be that the binding strands 246 would not be tightened on discharge of bale 294 and the bale would not be a tight integral unit; it would droop and perhaps fall apart on being picked up. In order for there to be sufficient resistance to rearward translation of the bulk material that will make up bale 294, it may be desirable to include blocking means at the rearward end of compartment 60 that will stop rearward movement of bulk material within compartment 60 during the time interval (2-3 seconds) in which the material dividing and bale tying occurs. FIGS. 18 and 19 depict such a blocking means in the form of top and bottom wedge means 300, 301. These blocking means are mounted on the rearward end sections of the top and bottom compression panels 230, 231. Top and bottom compression panels 230, 231 are each provided with a transverse slot 302, 303 in which top and bottom wedges 304, 305 fit. Wedges 304, 305 are provided with a rearward extension as seen in FIGS. 18-19 on which outwardly extending pivoting levers 306, 307 are attached. Levers 306, 307 are pivotally attached to actuating links 308, 309, which are in turn pivotally attached to actuating levers 310, 311. Actuating levers 310, 311 are respectively pivotally attached to the top and bottom walls 232, 233 of compartment 60 by means of mounting blocks 312, 313. Actuating levers 310, 311 are located with respect to the top and bottom cross bars 282, 283 or separating means 262 such that: a) when separating means 262 is inactivated (the FIG. 18 position), the cross bars 282, 283 will engage the actuating levers 310, 313 and pivot the levers rearwardly to the position shown in FIG. 18; and b) when separating means 262 is activated (the FIG. 19 position), the cross bars 282, 283 will shift out of engagement with the actuating levers 310, 311 as shown in FIG. 19. Pivoting levers 306, 307 are biased to tilt toward forwardly, as seen in FIG. 18, by means of coil springs 314, 315 which are anchored at an appropriate place to compartment 60. When cross bars 282, 283 are shifted out of contact with actuating levers 310, 311, the coil springs 314, 315 will cause the mechanism of elements 310, 308, 306, and 311, 309, 307, to shift forwardly, from the position shown in FIG. 18 to the position shown in FIG. 19. As a consequence, wedges 302, 303 will be pivoted downward and inward, through slots 303, 303, into the interior of compartment 60. When pivoted into the positions shown in FIG. 19, wedges 304, 305 will wedge into the top and bottom surfaces of the mass of bulk material contained at those locations and stop the rearward movement of the bulk material. As shown in FIGS. 18-19, wedges 304, 305 are located so as to engage the top and bottom surfaces of a tied bale 290; thus the stopping of the rearward movement of tied bale 290 will likewise stop the rearward movement of the mass of bulk material 292 (FIG. 18) that will become another tied bale 294 (FIG. 19). When wedges 304, 305 are pivoted into compartment 60, compression of the bulk material by separating means fingers 280, 281 will shorten that material into a more compact form for binding into another bale 294.

When separating means 262 is inactivated, cross bars 282, 283 are returned to the positions shown in FIG. 18 and contact actuating levers 310, 311 to pivot them rearwardly; thereby causing wedges 304, 305 to pivot out of compartment 60 and freeing the bulk material in compartment 60 to be moved rearwardly again after the binding of another bale 294. Simultaneously with the inactivation of separating means 262, restraining means 260 will be inactivated and restraining means fingers 268, 269 will be returned to the position shown in FIG. 18. When fingers 268, 269 are withdrawn from compartment 60, the mass of bulk material 292 within compartment 50 will be free again to move rearwardly. Inasmuch as material will have been continuously added by auger feeding means 10 to the forward end of this mass of bulk material 292, thereby adding to the compression of the bulk material in compartment 50, the withdrawal of fingers 268, 269 will cause the rearward edge of bulk material 292 to spring rearwardly into contact with the just-formed bale 294. Then, the condition will appear as shown in FIG. 19 once again; and the cycle will continue.

While the preferred embodiment of the invention has been described herein, variations in the design may be made. For example, the principles illustrated in the foregoing description and the drawings could be applied to a stationary baling machine. Such is illustrated in FIG. 10. In FIG. 10, all elements are as described in the foregoing with the exception of charging means 16. With respect to the charging means 16 as shown in FIG. 10, it consists of an open-top hopper into which material to be baled would be inserted; either manually or by some mechanical conveyor systems. In a stationary baling machine according to the present invention, the machine may be towable, as shown in FIG. 10, or it may be statically-mounted.

The embodiment illustrated is designed for towing by a farm tractor. The invention could be stationary or it could be self-propelled.

The scope of the invention, therefore, is only to be limited by the claims appended hereto.

The embodiments of the invention in which an exclusive property is claimed are defined as follows:

1. Apparatus for forming fibrous bulk material and like material into bales which comprises bale forming means for forming said material into an elongated continuous mass, said bale forming means having a bale-forming compartment with an infeed end and a discharge end, and material flow restricting means located for resisting the movement of said mass of material; auger feeding means for conveying said material into the infeed end of said bale-forming compartment;

compacting roller means so constructed and arranged with respect to said auger feeding means whereby material is conveyed through said compacting roller means into said bale-forming compartment and compacted against said mass of material at the bale-forming compartment infeed end, said compacting roller means and said material flow restricting means cooperatively functioning to create said mass of material in a compacted condition with material being added to said mass of material at the bale-forming compartment infeed end and compressed thereinto by said compacting roller means; and said auger feeding means comprising a longitudinal auger shaft having an infeed end and a discharge end, at least one conveyor flight mounted by said shaft between the shaft infeed and discharge ends; and wherein said compacting roller means is mounted by said auger shaft at the shaft discharge end and is so constructed and arranged with respect to said conveyor flight whereby material conveyed by said auger feeding means will pass from said conveyor flight and through said compacting roller means into said bale-forming compartment for distribution and compaction against the mass of material at the bale-forming compartment infeed end.

2. The apparatus of claim 1 wherein said compacting roller means comprises at least one roller mounted to said auger shaft and constructed and arranged to rotate on an axis extending radially outward from said auger shaft whereby said roller will contact and roll against material as it is conveyed into said bale-forming compartment and added to said mass of material.

3. The apparatus of claim 1 including material charging means for feeding said material into said auger feeding means.

4. The apparatus of claim 3 wherein said material charging means comprises pick up means for picking up fibrous bulk material from a field over which said apparatus is transported; and header means from conveying material from said pick up means into said auger feeding means.

5. The apparatus of claim 4 wherein said pick up means comprises an elongated rotary material pick up cylinder means extended transversely across the front of said apparatus; and wherein said header means comprises left and right material conveying augers mounted transversely behind said pick up cylinder means for conveying material picked up by said pick up cylinder means laterally inward to said auger feeding means; and drive means for said charging means for rotating said pick up cylinder means and said left and right material conveying augers.

6. The apparatus of claim 5 wherein said header means includes a transverse auger housing mounted to said auger feeding means and extended laterally outward to both sides of said apparatus; said left and right material conveying augers being rotatably mounted by said transverse auger housing such that said material conveying augers are rotatably driven from their outer ends; and wherein said drive means is so constructed and arranged and coupled to said left and right material conveying augers and to said pick up cylinder means whereby said drive means rotates one of said material conveying augers, said driven material conveying auger drives said pick up cylinder means, and said driven pick up cylinder means drives the other material conveying auger.

7. Apparatus for forming fibrous bulk material and like material into bales which comprises bale forming means for forming said material into an elongated continuous mass, said bale forming means having a bale-forming compartment with an infeed end and a discharge end, and material flow restricting means for resisting the movement of said mass of material; auger feeding means for conveying said material into the infeed end of said bale-forming compartment;

compacting roller means so constructed and arranged with respect to said auger feeding means whereby material is conveyed through said compacting roller-means into said bale-forming compartment and compacted against said mass of material at the bale-forming compartment infeed end, said compacting roller means and said material flow restricting means cooperatively functioning to create said mass of material in a compacted condition with material being added to said mass of material at the bale-forming compartment infeed end and compressed thereinto by said compacting roller means; and bale binding means for receiving said mass of material from the discharge end of said bale-forming compartment and binding said mass into discrete bales, said bale binding means comprising a bale-binding compartment having an infeed end and a discharge end, said bale-binding compartment infeed end communicating with said bale-forming compartment discharge end for receiving said compacted mass of material, and material flow restricting means located between the infeed and discharge ends for resisting the movement of said mass of material.

8. The apparatus of claim 7 wherein said bale-binding compartment comprises an infeed section and a bale binding section; and wherein said bale binding means comprises material dividing means communicating with said bale-binding compartment infeed section for separating the compacted mass of material received from said bale-forming compartment into a unit to be baled; and bale tying means communicating with said bale-forming compartment bale binding section for binding a separated unit into a discrete bale.

9. The apparatus of claim 8 wherein said material dividing means comprises restraining means for stopping movement of said compacted mass of material into the bale-binding compartment infeed section, and separating means for separating the compacted mass of material within said bale-binding compartment binding section from the mass of material restrained by said restraining means whereby said separated unit may be bound into a discrete bale.

10. The apparatus of claims 9 wherein said bale binding means includes wedge means for stopping movement of said separated unit during the binding thereof, said wedge means and said material dividing means being so constructed and arranged such that said wedge means, and said material dividing means are actuated together whereby said separated unit is additionally compacted prior to being found into a discrete bale.

11. Apparatus for forming fibrous bulk material and like materials into bales which comprises bale forming means for forming said material into an elongated continuous mass, said bale forming means having a bale-forming compartment with an infeed end and a discharge end, and material flow restricting means for resisting the movement of said mass of material; auger feeding means for conveying said material into the infeed end of said bale-forming compartment;

compacting roller means so constructed and arranged with respect to said auger feeding means whereby material is conveyed through said compacting roller means into said bale-forming compartment and compacted against said mass of material at the bale-forming compartment infeed end, said compacting roller means and said material flow restricting means cooperatively functioning to create said mass of material in a compacted condition with material being added to said mass of material at the bale-forming compartment infeed end and compressed thereinto by said compacting roller means;

said auger feeding means comprising a longitudinal auger shaft having an infeed end and a discharge end, at least one conveyor flight mounted by said shaft between the shaft infeed and discharge ends;

said compacting roller means being mounted by said auger shaft at the shaft discharge end and is so constructed and arranged with respect to said conveyor flight whereby material conveyed by said auger feeding means will pass from said conveyor flight and through said compacting roller means into said bale-forming compartment for distribution and compaction against the mass of material at the bale-forming compartment infeed end; and material charging means for feeding said material into said auger feeding means which comprises pick up means for picking up fibrous bulk material from a field over which said apparatus is transported; and header means for conveying material from said pick up means into said auger feeding means.

12. The apparatus of claim 11 wherein said compacting roller means comprises at least one roller mounted to said auger shaft and constructed and arranged to rotate on an axis extending radially outward from said auger shaft whereby said roller will contact and roll against material as it is conveyed into said bale-forming compartment and added to said mass of material.

13. The apparatus of claim 11 including bale binding means comprising a bale-binding compartment having an infeed end and a discharge end, said bale-binding compartment infeed end communicating with said bale-forming compartment discharge end for receiving said compacted mass of material, and material flow restricting means located between the infeed and discharge ends for resisting the movement of said mass of material.

14. The apparatus of claim 14 wherein said bale-binding compartment comprises an infeed section and a bale binding section; and wherein said bale binding means comprises material dividing means communicating with said bale-binding compartment infeed section for separating the compacted mass of material received from said bale-forming compartment into a unit to be baled; and bale tying means communicating with said bale-forming compartment bale binding section for binding a separated unit into a discrete bale.

15. The apparatus of claim 14 wherein said material dividing means comprises restraining means for stopping movement of said compacted mass of material into the bale-binding compartment infeed section, and separating means for separating the compacted mass of material within said bale-binding compartment binding section from the mass of material restrained by said restraining means whereby said separated unit may be bound into a discrete bale.

16. The apparatus of claim 15 wherein said bale binding means includes wedge means for stopping movement of said separated unit during the binding thereof, said wedge means and said material dividing means being so constructed and arranged such that said wedge means and said material dividing means are actuated together whereby said separated unit is additionally compacted prior to being bound into a discrete bale.

17. The apparatus of claim 11 wherein said pick up means comprises an elongated rotary material pick up cylinder means extended transversely across the front of said apparatus; and wherein said header means comprises left and right material conveying augers mounted transversely behind said pick up cylinder means for conveying material picked up by said pick up cylinder means laterally inward to said auger feeding means; and drive means for said charging means for rotating said pick up cylinder means and said left and right material conveying augers.

18. Apparatus for forming fibrous bulk material and like material into bales which comprises bale forming means for forming said material into an elongated continuous mass, said bale forming means having a bale-forming compartment with an infeed end and a discharge end, and material flow restricting means for resisting the movement of said mass of material; auger feeding means oriented longitudinally in line with said bale-forming compartment for conveying said material into the infeed end of said bale-forming compartment;
rotary compacting roller means rotatable about an axis transverse to said bale-forming compartment and so constructed and arranged with respect to said auger feeding means and the infeed end of said bale-forming compartment whereby material is conveyed through said compacting roller means into said bale-forming compartment and distributed arcuately against the adjacent end of said mass of material, said compacting roller means and said material flow restricting means cooperatively functioning to create said mass of material in a compacted condition with material being added longitudinally to said mass of material at the bale-forming compartment infeed end and compressed thereinto by said compacting roller means.

19. The apparatus of claim 18 wherein said compacting roller means comprises at least one roller constructed and arranged to rotate on an axis extending radially outward from said auger feeding means whereby said roller will contact and roll against material as it is conveyed into said bale-forming compartment and added to said mass of material.

20. The apparatus of claim 18 including bale binding means including a bale-binding compartment communicating with said bale-forming compartment for receiving said compacted mass of material, and binding means for binding the received compacted mass of material into a discrete bale.

21. The apparatus of claim 20 including restraining means for stopping movement of said compacted mass of material into said bale-binding compartment while said bale binding means is binding a received compacted mass of material into a discrete bale.

22. The apparatus of claim 19 including material charging means comprising pick up means for picking up fibrous bulk material from a field over which said apparatus is transported; and header means for conveying material from said pick up means into said auger feeding means.

23. The apparatus of claim 22 wherein said pick up means comprises an elongated rotary material pick up cylinder means extended transversely across the front of said apparatus; and wherein said header means comprises left and right material conveying augers mounted transversely behind said pick up cylinder means for conveying material picked up by said pick up cylinder means laterally inward to said auger feeding means; and drive means for said charging means for rotating said pick up cylinder means and said left and right material conveying augers.

24. The apparatus of claim 23 wherein said header means includes a transverse auger housing mounted to said auger feeding means and extended laterally outward to both sides of said apparatus; said left and right material conveying augers being rotatably mounted by said transverse auger housing such that said material conveying augers are rotatably driven from their outer ends; and wherein said drive means is so constructed and arranged and coupled to said left and right material conveying augers and to said pick up cylinder means whereby said drive means rotates one of said material conveying augers, said driven material conveying auger drives said pick up cylinder means, and said driven pick up cylinder means drives the other material conveying auger.

25. The apparatus of claim 22 including bale binding means including a bale-binding compartment communicating with said bale-forming compartment for receiving said compacted mass of material, and binding means for binding the received compacted mass of material into a discrete bale.

26. The apparatus of claim 18 including material charging means for feeding said material into said auger feeding means.

27. The apparatus of claim 26 wherein said material charging means comprises pick up means for picking up fibrous bulk material from a field over which said apparatus is transported; and header means for conveying material from said pick up means into said auger feeding means.

28. The apparatus of claim 27 wherein said pick up means comprises an elongated rotary material pick up cylinder means extended transversely across the front of said apparatus; and wherein said header means comprises left and right material conveying augers mounted transversely behind said pick up cylinder means for conveying material picked up by said pick up cylinder means laterally inward to said auger feeding means; and drive means for said charging means for rotating said pick up cylinder means and said left and right material conveying augers.

29. The apparatus of claim 28 wherein said header means includes a transverse auger housing mounted to said auger feeding means and extended laterally outward to both sides of said apparatus; said left and right material conveying augers being rotatably mounted by said transverse auger housing such that said material conveying augers are rotatably driven from their outer ends; and wherein said drive means is so constructed and arranged and coupled to said left and right material conveying augers and to said pick up cylinder means whereby said drive means rotates one of said material conveying augers, said driven material conveying auger drives said pick up cylinder means, and said driven pick up cylinder means drives the other material conveying auger.

* * * * *